United States Patent
Kanagarathinam et al.

(10) Patent No.: US 12,477,385 B2
(45) Date of Patent: Nov. 18, 2025

(54) MANAGING QUALITY OF SERVICE OF APPLICATIONS IN WIRELESS NETWORK

(71) Applicant: Samsung Electronics Co., Ltd., Suwon-si (KR)

(72) Inventors: Madhan Raj Kanagarathinam, Karnataka (IN); Irlanki Sandeep, Karnataka (IN); Kavin Kumar Thangadorai, Karnataka (IN); Srihari Kuncha, Karnataka (IN); Dronamraju Siva Sabareesh, Karnataka (IN); Srihari Sriram, Karnataka (IN); Sukhdeep Singh, Karnataka (IN); Sri Vinod Palacharla, Karnataka (IN); Jayendra Reddy Kovvuri, Karnataka (IN); Mohan Rao Goli, Karnataka (IN); Sunghee Lee, Karnataka (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 348 days.

(21) Appl. No.: 18/447,756

(22) Filed: Aug. 10, 2023

(65) Prior Publication Data

US 2024/0056878 A1    Feb. 15, 2024

(30) Foreign Application Priority Data

Aug. 10, 2022  (IN) .............................. 202241045747
Jul. 20, 2023   (IN) .............................. 202241045747

(51) Int. Cl.
    G06F 15/173    (2006.01)
    H04W 28/02     (2009.01)
(52) U.S. Cl.
    CPC .............................. *H04W 28/0268* (2013.01)

(58) Field of Classification Search
    None
    See application file for complete search history.

(56) References Cited

U.S. PATENT DOCUMENTS

| | | | |
|---|---|---|---|
| 2016/0165637 A1* | 6/2016 | Kim .................. | H04W 52/0229 370/329 |
| 2016/0234124 A1* | 8/2016 | Tomici ................ | H04L 47/2491 |
| 2017/0251401 A1 | 8/2017 | Comstock | |

OTHER PUBLICATIONS

Indian Office Action issued May 26, 2025 in corresponding Indian Patent Application No. 202241045747 and English-language translation.

* cited by examiner

*Primary Examiner* — Wing F Chan
*Assistant Examiner* — Andrew Woo
(74) *Attorney, Agent, or Firm* — Nixon & Vanderhye, P.C.

(57) ABSTRACT

Embodiments herein provide a method for managing Quality of Service (QoS) of applications in a wireless network. Detecting a plurality of data traffic of plurality of applications based on current activities of a user equipment (UE), hardware components of UE, a plurality traffic parameter, a QoS report received from an access point (AP) associated with UE in a wireless network. Detecting an enhanced distributed channel access (EDCA) function based on plurality of data traffic. The EDCA function includes current mapping between access category of each data structure and traffic category of plurality of data traffic based on association. Classifying plurality of data traffic of the plurality of applications into priority data traffic category and non-priority data traffic category based on current mapping of the EDCA function. Modifying current mapping of EDCA function based on priority data traffic category, non-priority (Continued)

data traffic category, and access category of each data structure of plurality of data structures.

15 Claims, 12 Drawing Sheets

MANAGING QUALITY OF SERVICE OF APPLICATIONS IN WIRELESS NETWORK

CROSS-REFERENCE TO RELATED APPLICATIONS

This application is based on and claims priority under 35 U.S.C. § 119 to Indian Provisional Patent Application No. 202241045747 filed on Aug. 10, 2022, in the Indian Patent Office, and to Indian Complete Patent Application No. 202241045747, filed on Jul. 20, 2023, in the Indian Patent Office, the disclosures of each of which are incorporated by reference herein in their entireties.

BACKGROUND

Field

The disclosure relates to a wireless network. For example, the disclosure relates to a system and method for managing a quality of service of applications in the wireless network.

Description of Related Art

In general, a plurality of applications like voice, video, background updates etc., are facing a plurality of data traffic in a wireless network. The plurality of applications is different based on a tolerance of data traffic delays in the wireless network. Certain applications can tolerate data traffic loss, and other applications cannot tolerate some degree of data traffic loss. As a result, different applications have different requirements for handling the data traffic in the wireless network. In a $5^{th}$ generation (5G) wireless network, when the data traffic is not prioritized in intermediate routers, the data traffic from slow flows blocks 5G packets increasing latency that leads to data traffic in 5G. As a result, the 5G wireless network is affected and cannot reach peak throughputs.

The wireless network interconnects hosts using a variety of network devices which include network interfaces for interconnecting the various devices. The plurality of applications sends data over the wireless network by submitting it to an operating system which becomes network traffic. The network devices generally forward network traffic from one wireless network interface to another wireless network interface. Each wireless network interface sends and receives the plurality of data traffic in the wireless network at a finite rate. When the finite rate data traffic is directed to the wireless network interface that exceeds the finite rate leading to a congestion. The network devices handle the congestion by queuing data traffic in the device's memory until the congestion subsides. In some scenarios, the network devices discard some excess traffic to alleviate congestion.

The wireless network quality of service (QoS) represents the ability of the wireless network to handle data traffic for certain applications. The wireless network QoS requires fundamental traffic handling mechanisms to identify and control the data traffic. The QoS mechanisms control allocation of the network resources to application traffic to meet the application's service requirements. For example, during congestion, the network device chooses queue traffic of applications that has more latency tolerance instead of the traffic of applications that has less latency tolerance, so the less latency tolerant traffic applications are forwarded immediately to the next network device. In an example, the interface capacity is a resource that is granted to the latency-intolerant traffic when the device memory is the resource that has granted to the latency-tolerant traffic.

To address the data traffic problems, a differentiated services code point (DSCP) value is introduced in an internet protocol (IP) header to identify the level of service based on packets received in the wireless network for solving the data traffic problems by setting the default DSCP value. In such a scenario, some applications are setting wrong DSCP value and some applications are not setting the DSCP value that leads to poor QoS especially when the wireless network faces more data traffic.

Thus, it is desired to address the above-mentioned disadvantages or other shortcomings or at least provide a useful alternative to overcome the inter-device connection setup problems and synchronization problems.

SUMMARY

Embodiments of the disclosure provide a system and method for managing a QoS of applications in a wireless network. The disclosed methods detect a plurality of data traffic of a plurality of applications for modifying a current mapping of an enhanced distributed channel access (EDCA) function. In the disclosed methods, the plurality of data traffic of the plurality of applications is reduced based on the modification of the current mapping of the EDCA function.

Embodiments of the disclosure provide a method to upgrade current mapping of the EDCA function by translating a high-priority data traffic to a priority access category to reduce the latency of the high-priority data traffic.

Embodiments of the disclosure provide a method to downgrade the current mapping of the EDCA function by translating a low-priority data traffic to a non-priority access category.

Embodiments of the disclosure provide a method to allocate a DSCP value for data traffic based on the priority data traffic category and the non-priority data traffic category.

Embodiments of the disclosure provide a method to send a QoS report to a user equipment (UE) for managing the QoS of the applications in the wireless network.

According to an example embodiment, a method for managing a QoS of applications in a wireless network is provided. The method includes detecting, by a user equipment (UE), a plurality of data traffic of a plurality of applications based on at least one of current activities of the UE, hardware components of the UE, a plurality traffic parameters, a quality of service (QoS) report received from an access point (AP) associated with the UE in the wireless network. Each data traffic of the plurality of data traffic has an association with a data structure of a plurality of data structures of the UE. The method includes detecting an enhanced distributed channel access (EDCA) function based on the plurality of data traffic. The EDCA function includes a current mapping between an access category of each data structure and a traffic category of each data traffic of the plurality of data traffic based on the association. Further, the method includes classifying the plurality of data traffic of the plurality of applications into a priority data traffic category and a non-priority data traffic category based on the current mapping of the EDCA function. The method includes modifying the current mapping of the EDCA function based on the priority data traffic category, the non-priority data traffic category, and the access category of each data structure of the plurality of data structures.

According to an example embodiment, the method includes detecting a current data structure of the plurality of data structures associated with data traffic of the plurality of data traffic classified into the priority data traffic category. The method includes detecting the access category of the current data structure as one of a priority access category and a non-priority access category. The method includes upgrading the current mapping of the EDCA function by translating the data traffic classified into the priority data traffic category from the current data structure to another data structure of the plurality of data structures having the priority access category, based on the access category of the at least one current data structure indicating the non-priority access category.

According to an example embodiment, the method includes detecting the current data structure of the plurality of data structures associated with the data traffic of the plurality of data traffic classified into the non-priority data traffic category. The method includes detecting the access category of the current data structure as one of the priority access category and the non-priority access category. The method includes downgrading the current mapping of the EDCA function by translating the data traffic classified into the non-priority data traffic category from the current data structure to another data structure of the plurality of data structures having the non-priority access category, based on the access category of the at least one current data structure indicating the priority access category.

According to an example embodiment, the method includes detecting an IP header of each data traffic of the plurality of data traffic whether a differentiated services code point (DSCP) value is set to a default value. The method includes allocating the DSCP value in the IP header of each data traffic of the plurality of data traffic based on the priority data traffic category and the non-priority data traffic category, based on the DSCP value not being set or being set to the default value.

According to an example embodiment, the method includes monitoring a packet loss rate and an error packet for each data traffic of the plurality of data traffic based on allocated DSCP value. The method includes determining a drop in the QoS for the data traffic classified into the priority data traffic category and the non-priority data traffic category based on the packet loss rate and the error packets. The method includes modifying the DSCP value for the data traffic classified into the priority data traffic category and the non-priority data traffic category back to the detected DSCP value, based on the drop in the QoS being determined.

According to an example embodiment, a method for managing the QoS of applications in the wireless network is provided. The method includes receiving a plurality of parameters from a plurality of devices available in the wireless network. The method includes determining a QoS report based on the plurality of parameters received from the plurality of devices. The QoS report includes a wireless network usage pattern by each device of the plurality of devices, a list of active devices from the plurality of devices, a list of inactive device from the plurality of devices, a metadata of data traffic associated with the list of active devices, and a metadata data traffic associated with a list of inactive devices. The method includes receiving a request message for the QoS report from the UE in the wireless network. The method includes sending the QoS report to the UE for managing the QoS of the applications in the wireless network.

According to an example embodiment, a UE for managing the QoS of applications in the wireless network is provided. The UE includes a memory storing a plurality of applications, a processor, and a traffic translation controller communicatively coupled to the memory and the processor. The traffic translation controller is configured to detect the plurality of data traffic of the plurality of applications based on the current activities of the UE, the hardware components of the UE, the plurality traffic parameter, the QoS report received from the AP associated with the UE in the wireless network. Each data traffic of the plurality of data traffic has the association with the data structure of a plurality of data structures of the UE. The traffic translation controller is configured to detect the EDCA function based on the plurality of data traffic. The EDCA function includes a current mapping between the access category of each data structure and the traffic category of each data traffic of the plurality of data traffic based on the association. The traffic translation controller is configured to classify the plurality of data traffic of the plurality of applications into the priority data traffic category and the non-priority data traffic category based on the current mapping of the EDCA function. The traffic translation controller is configured to modify the current mapping of the EDCA function based on the priority data traffic category, the non-priority data traffic category, and the access category of each data structure of the plurality of data structures.

According to an example embodiment, an AP for managing the QoS of applications in the wireless network is provided. The AP includes a memory storing the plurality of applications, a processor, a controller communicatively coupled to the memory and the processor. The controller is configured to receive the plurality of parameters from the plurality of devices available in the wireless network. The AP is configured to determine the QoS report based on the plurality of parameters received from the plurality of devices. The QoS report includes the wireless network usage pattern by each device of the plurality of devices, the list of active devices from the plurality of devices, the list of inactive devices from the plurality of devices, the metadata of data traffic associated with the list of active devices, and the metadata data traffic associated with a list of inactive devices. The AP is configured to receive the request message for the QoS report from the UE in the wireless network. The AP is configured to send the QoS report to the UE for managing the QoS of the applications in the wireless network.

These and other aspects of the various example embodiments herein will be better appreciated and understood when considered in conjunction with the following description and the accompanying drawings. It is understood, however, that the following descriptions, while indicating example embodiments and numerous specific details thereof, are given by way of illustration and not of limitation. Many changes and modifications be made within the scope of the disclosure herein without departing from the spirit thereof, and the disclosure herein includes all such modifications.

BRIEF DESCRIPTION OF THE DRAWINGS

These and other features, aspects, and advantages of certain embodiments of the present disclosure will be more apparent from the following detailed description, taken in conjunction with the accompanying drawings, throughout which like reference letters indicate corresponding parts in the various figures, and in which.

Figure 1:
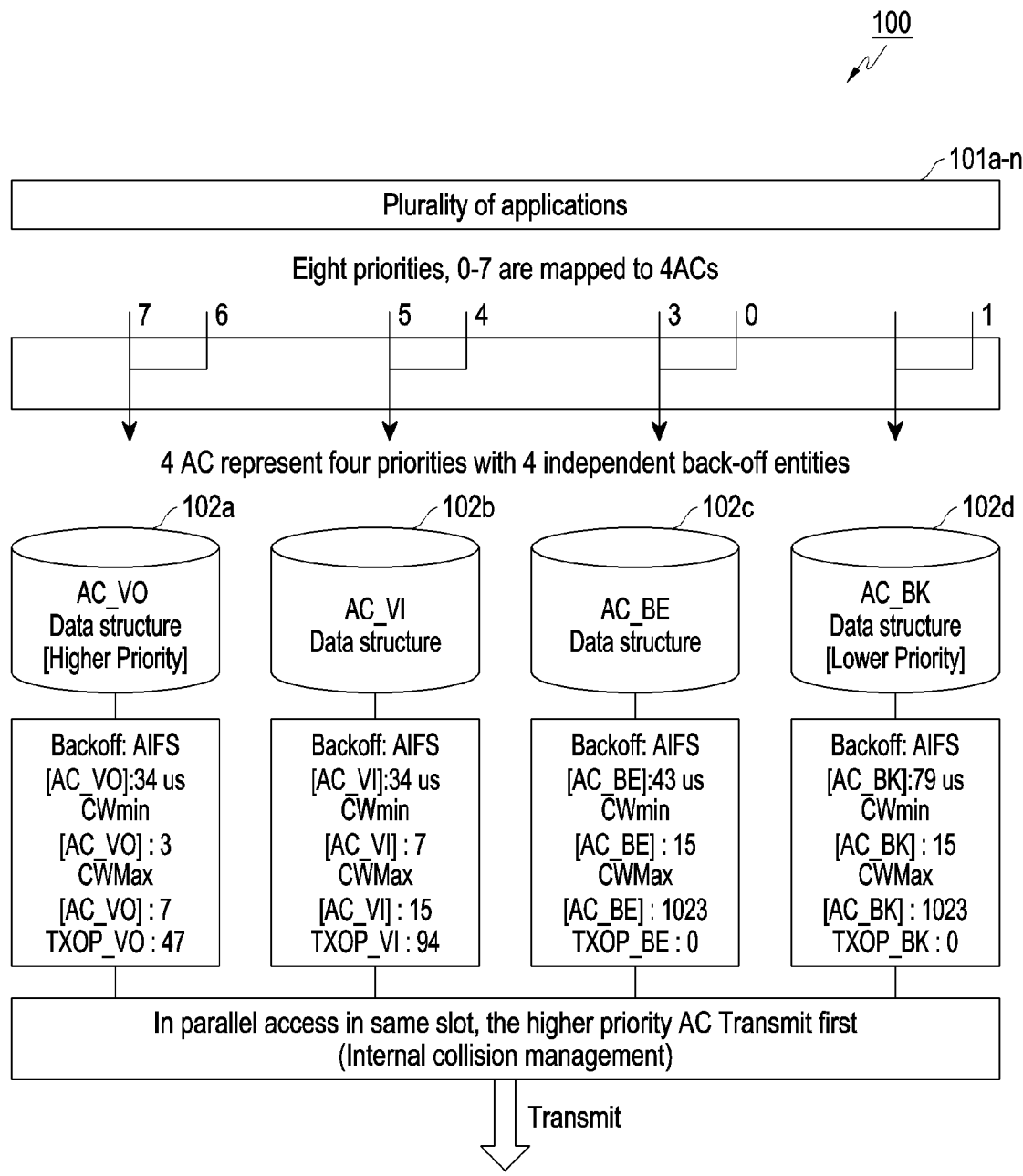
FIG. 1 is a diagram illustrating an EDCA function, according to the prior art.

It may be noted that to the extent possible, like reference numerals have been used to represent like elements in the drawings. Further, those of ordinary skill in the art will appreciate that elements in the drawing are illustrated for simplicity and may not have been necessarily drawn to scale. For example, the dimension of some of the elements in the drawing may be exaggerated relative to other elements to help to improve the understanding of various aspects of the disclosure. Furthermore, the elements may have been represented in the drawing by conventional symbols, and the drawings may show specific details that are pertinent to the understanding the disclosure so as not to obscure the drawing with details that will be readily apparent to those of ordinary skill in the art having benefit of the description herein.

DETAILED DESCRIPTION

The various example embodiments herein and the various features and advantageous details thereof are explained more fully with reference to the non-limiting example embodiments that are illustrated in the accompanying drawings and described in greater detail in the following disclosure. Descriptions of well-known components and processing techniques may be omitted so as to not unnecessarily obscure the disclosure. The various example embodiments described herein are not necessarily mutually exclusive, as various embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples are not be construed as limiting the scope of the disclosure.

Various example embodiments are described and illustrated in terms of blocks that carry out a described function or functions. These blocks, which referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and optionally be driven by firmware and software. The circuits, for example, be embodied in one or more semiconductor chips, or on substrate supports such as printed circuit boards and the like. The circuits of a block be implemented by dedicated hardware, or by a processor (e.g., one or more programmed microprocessors and associated circuitry), or by a combination of dedicated hardware to perform some functions of the block and a processor to perform other functions of the block. Each block of the embodiments be physically separated into two or more interacting and discrete blocks without departing from the scope of the disclosed method. Likewise, the blocks of the embodiments be physically combined into more complex blocks without departing from the scope of the disclosed method.

The accompanying drawings are used to help easily understand various technical features and it is understood that the embodiments presented herein are not limited by the accompanying drawings. As such, the disclosed method should be construed to extend to any alterations, equivalents, and substitutes in addition to those which are particularly set out in the accompanying drawings. Although the terms first, second, etc. used herein to describe various elements, these elements are not be limited by these terms. These terms are generally used to distinguish one element from another.

Accordingly, various example embodiments disclose a method for managing a QoS of applications in a wireless network. The method includes detecting, by a UE, a plurality of data traffic of a plurality of applications based on at least one of current activities of the UE, hardware components of the UE, a plurality traffic parameter, a QoS report received from an AP associated with the UE in the wireless network. Each data traffic of the plurality of data traffic has an association with a data structure of a plurality of data structures of the UE. The method includes detecting an EDCA function based on the plurality of data traffic. The EDCA function includes a current mapping between an access category of each data structure and a traffic category of each data traffic of the plurality of data traffic based on the association. Further, the method includes classifying the plurality of data traffic of the plurality of applications into a priority data traffic category and a non-priority data traffic category based on the current mapping of the EDCA function. Also, the method includes modifying the current mapping of the EDCA function based on the priority data traffic category, the non-priority data traffic category, and the access category of each data structure of the plurality of data structures.

Accordingly, various example embodiments disclose a method for managing the QoS of applications in the wireless network. The method includes receiving a plurality of parameters from a plurality of devices available in the wireless network. Further, the method includes determining a QoS report based on the plurality of parameters received from the plurality of devices. The QoS report includes a wireless network usage pattern by each device of the plurality of devices, a list of active devices from the plurality of devices, a list of inactive devices from the plurality of devices, a metadata of data traffic associated with the list of active devices, and a metadata data traffic associated with a list of inactive devices. Also, the method includes receiving a request message for the QoS report from the UE in the wireless network. The method includes sending the QoS report to the UE for managing the QoS of the applications in the wireless network.

Accordingly, various example embodiments disclose a UE for managing the QoS of applications in the wireless network. The UE includes a memory storing a plurality of applications, a processor, and a traffic translation controller communicatively coupled to the memory and the processor. The traffic translation controller detects the plurality of data traffic of the plurality of applications based on the current activities of the UE, the hardware components of the UE, the plurality traffic parameter, the QoS report received from the AP associated with the UE in the wireless network. Each data traffic of the plurality of data traffic has the association with the data structure of a plurality of data structures of the UE. The traffic translation controller detects the EDCA function based on the plurality of data traffic. The EDCA function includes a current mapping between the access category of each data structure and the traffic category of each data traffic of the plurality of data traffic based on the association. Further, the traffic translation controller classifies the plurality of data traffic of the plurality of applications into the priority data traffic category and the non-priority data traffic category based on the current mapping of the EDCA function. Also, the traffic translation controller modifies the current mapping of the EDCA function based on the priority data traffic category, the non-priority data traffic category, and the access category of each data structure of the plurality of data structures.

Accordingly, various example embodiments disclose an AP for managing the QoS of applications in the wireless network. The AP includes a memory storing the plurality of applications, a processor, a controller communicatively coupled to the memory and the processor. The controller receives the plurality of parameters from the plurality of devices available in the wireless network. The AP determines the QoS report based on the plurality of parameters received from the plurality of devices. The QoS report includes the wireless network usage pattern by each device of the plurality of devices, the list of active devices from the plurality of devices, the list of inactive devices from the plurality of devices, the metadata of data traffic associated with the list of active devices, and the metadata data traffic associated with a list of inactive devices. Also, the AP receives the request message for the QoS report from the UE in the wireless network. Further, the AP sends the QoS report to the UE for managing the QoS of the applications in the wireless network.

FIG. 1 is a diagram (100) illustrating a plurality of data structures for a plurality of applications, according to the prior art.

In conventional methods, for example, when the UE receives a plurality of applications ($101_{a-n}$) from the wireless network. Each application has a separate priority that is mapped to a separate data structure. The user priority numbers 0-7 are mapped to the plurality of access categories. For example, the user priority number 1 is mapped to the AC_BK access category, the user priority numbers 0 and 3 are mapped to the AC_BE access category, the user priority numbers 4 and 5 are mapped to the AC_VI access category and the user priority numbers 6 and 7 are mapped to the AC_VO access category. Each data structure is configured with different access categories (e.g., $102_{a-d}$) along with independent back-off entities. The access categories (AC) like high-priority access categories, medium-priority access categories, and low-priority access categories. The application relates to voice (VO) data and video (VI) data are performed using the high-priority access categories. The application related to best-effect (BE) and background (BK) is performed using the low-priority access categories or the medium-priority access categories. Normally, each application faces data traffic with respect to user activities. In such a scenario, when best-effort data structure faces high-priority data traffic, the application related to the best-effort data structure faces more latency due to the configuration of the low-priority access category and when voice data structure and video data structure face low-priority data traffic, the application related to the voice data structure and video data structure faces less latency due to the configuration of the high-priority access category. As a result, the high-priority data traffic is executed in the low-priority access category of the data structure and the low-priority data traffic is executed in the high-priority access category of the data structure. A current mapping between each access category of the data structure and each data traffic of the application is called an EDCA function that cannot be changed in the existing methods.

Unlike the conventional methods, according to various example embodiments, the UE detects a plurality of data traffic of the plurality of applications and determines the EDCA function based on the plurality of data traffic. The plurality of data traffic is classified into a priority data traffic category and a non-priority data traffic category based on the current mapping of the EDCA function. The current mapping of the EDCA function is modified based on the priority data traffic category, the non-priority data traffic category, and the access category of each data structure to reduce the traffic among the plurality of applications. The disclosed method is an application-agnostic framework that detects the access category of application traffic in the UE. The disclosed embodiments promote data traffic to the corresponding access category for a smoother user experience. The UE does not require any changes in the server and enhances the existing application in the device without any application update.

Referring now to the drawings and more particularly to FIGS. 2 through 12, where similar reference characters denote corresponding features consistently throughout the figures, there are shown various example embodiments.

Figure 2:
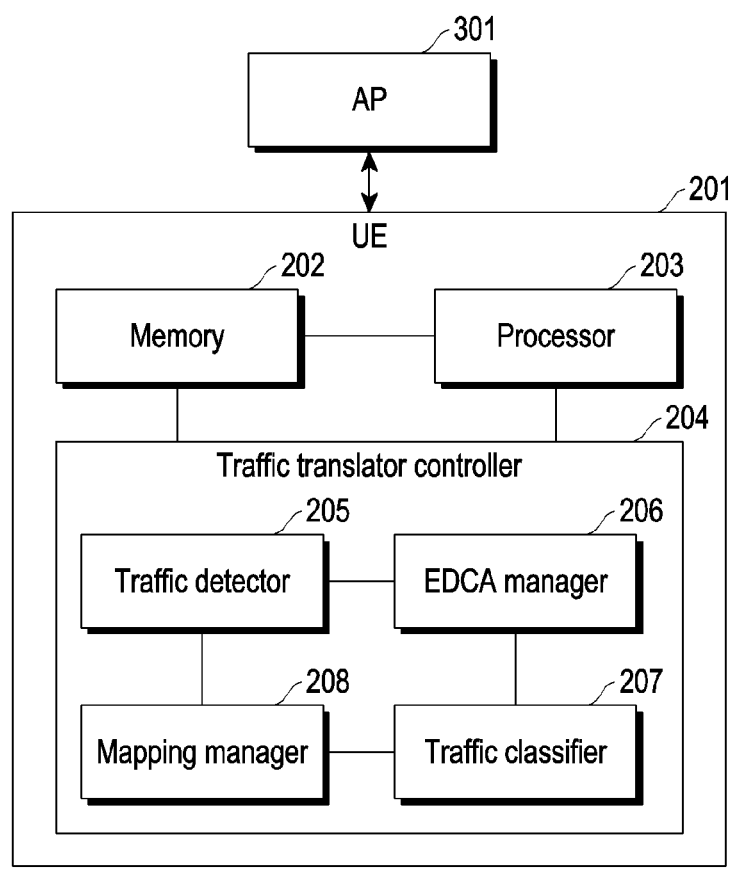
FIG. 2 is a block diagram illustrating an example configuration of a UE, according to various embodiments.

FIG. 2 is a block diagram illustrating an example configuration of a UE (201), according to various embodiments.

The UE (201) includes a memory (202), a processor (e.g., including processing circuitry) (203), and a traffic translator controller (e.g., including processing/control circuitry) (204) communicatively coupled to the memory (202) and the processor (203). The traffic translation controller (204) detects a plurality of data traffic of a plurality of applications based on a current activity of the UE (201), hardware components of the UE (201), a plurality traffic parameter, a QoS report received from an AP (301) associated with the UE (201) in the wireless network. Each data traffic of the plurality of data traffic has an association with a data structure of a plurality of data structures of the UE (201). The traffic translation controller (204) detects an EDCA function based on the plurality of data traffic. The EDCA function includes a current mapping between an access category of each data structure and a traffic category of each data traffic of the plurality of data traffic based on the association. The traffic translation controller (204) classifies the plurality of data traffic of the plurality of applications into a priority data traffic category and a non-priority data traffic category based on the current mapping of the EDCA function. Further, the traffic translation controller (204)

modifies the current mapping of the EDCA function based on the priority data traffic category, the non-priority data traffic category, and the access category of each data structure of the plurality of data structures.

The memory (202) is configured to store instructions to be executed by the processor (203). The memory (202) includes non-volatile storage elements. Examples of such non-volatile storage elements includes magnetic hard discs, optical discs, floppy discs, flash memories, or forms of electrically programmable memories (EPROM) or electrically erasable and programmable memories (EEPROM). In addition, the memory (202) in various examples, be considered a non-transitory storage medium. The term "non-transitory" indicates that the storage medium is not embodied in a carrier wave or a propagated signal. The term "non-transitory" is not be interpreted that the memory (202) is non-movable. In various examples, the memory (202) is configured to store larger amounts of information. In certain examples, a non-transitory storage medium stores data that may, over time, change (e.g., in random access memory (RAM) or cache).

The processor (203) includes one or a plurality of processors. The one or the plurality of processors is a general-purpose processor, such as a central processing unit (CPU), an application processor (AP), or the like, a graphics processing unit such as a graphics processing unit (GPU), a visual processing unit (VPU), and/or an AI-dedicated processor such as a neural processing unit (NPU). The processor (203) includes multiple cores and is configured to execute the instructions stored in the memory (202).

In an embodiment, the traffic translation controller (204) includes a traffic detector (205), an EDCA manager (206), a traffic classifier (207), and a mapping manager (208), each of which may include various processing circuitry and/or executable program instructions. The traffic detector (205) detects the plurality of data traffic of a plurality of applications based on the current activities of the UE (201), the hardware components of the UE (201), the plurality traffic parameter, the QoS report received from the AP (301) associated with the UE (201) in the wireless network. The traffic detector (205) sends the plurality of data traffic information to the EDCA manager (206).

The EDCA manager (206) detects the EDCA function based on the plurality of data traffic information received from the traffic detector (205). The EDCA function includes the current mapping between the access category of each data structure and the traffic category of each data traffic of the plurality of data traffic based on the association. The EDCA manager (206) maintains the current mapping between the access category of each data structure and each data traffic of each application. For example, the UE (201) receives application 1, 2, 3 and 4 from the AP (301). When the applications 1 and 2 are accessed through the priority access category of the data structure and the applications 3 and 4 are accessed through the non-priority access category of the data structure, the EDCA manager (206) maintains the details of data traffic of each application corresponding to the access category of the data structure. For example, the EDCA manager (206) maintains the details like application 1 and 2 are accesses through the priority access category of the data structure and the application 3 and 4 are accessed through the non-priority access category of the data structure.

The traffic classifier (207) classifies the plurality of data traffic of the plurality of applications into the priority data traffic category and the non-priority data traffic category based on the current mapping of the EDCA function. For example, when any of the priority application of the plurality of applications facing data traffic issue, then the data traffic corresponding to the priority application is categorized as the priority data traffic category. Similarly, when any of the non-priority application of the plurality of applications facing data traffic issue, then the data traffic corresponding to the non-priority application is categorized as non-priority data traffic category. In an embodiment, the traffic classifier (207) classifies a priority data traffic category based on the data structure associated with the data traffic corresponding to the priority application. Similarly, the traffic classifier (207) classifies a non-priority data traffic category based on the data structure associated with the data traffic corresponding to the non-priority application. Also, the traffic classifier (207) classifies the access category of the data structure as the priority access category and the non-priority access category.

The mapping manager (208) modifies the current mapping of the EDCA function based on the priority data traffic category, the non-priority data traffic category, and the access category of each data structure of the plurality of data structures. In an embodiment, the mapping manager (208) detects the access category of the current data structure associated with priority data traffic category is the non-priority access category. The mapping manager (208) upgrades the current mapping of the EDCA function by translating the priority data traffic category from the current data structure to another data structure that have priority access category. Similarly, the mapping manager (208) detects the access category of the current data structure associated with non-priority data traffic category is the priority access category. The mapping manager (208) downgrades the current mapping of the EDCA function by translating the non-priority data traffic category from the current data structure to another data structure that have the non-priority access category.

The current mapping of the EDCA function is changed based on allocating the DSCP value in the IP header of each data traffic of the plurality of data traffic. The mapping manager (208) detects the IP header of each data traffic of the plurality of data traffic whether the DSCP value is not set or is set to a default value. When the DSCP value is not set for the priority data traffic category, the mapping manager (208) allocate the DSCP value in the IP header of each data traffic for the priority data traffic category. Similarly, when the DSCP value is not set for the non-priority data traffic category, the mapping manager (208) allocate the DSCP value in the IP header of each data traffic for the non-priority data traffic category.

In an embodiment, when the mapping manager (208) detects the non-priority access category of the current data structure associated with the priority data traffic category, the mapping manager (208) upgrades the current mapping of the EDCA function by translating the priority data traffic category from the non-priority access category of the current data structure to another data structure that have priority access category by allocating the appropriate DSCP value to the priority data traffic category. Similarly, the mapping manager (208) detects the priority access category of the current data structure associated with the non-priority data traffic category, the mapping manager (208) downgrades the current mapping of the EDCA function by translating the non-priority data traffic category from the priority access category of the current data structure to the another data structure that have non-priority access category by allocating the appropriate DSCP value to the non-priority data traffic category.

The traffic translator controller (204) may be implemented by processing circuitry such as logic gates, integrated circuits, microprocessors, microcontrollers, memory circuits, passive electronic components, active electronic components, optical components, hardwired circuits, or the like, and optionally be driven by firmware. The circuits for example, be embodied in one or more semiconductor chips, or on substrate supports such as printed circuit boards and the like.

At least one of the plurality of modules/components of the traffic translator controller (204) is implemented through an AI model. A function associated with the AI model that is performed through the memory (202) and the processor (203). The one or more processors controls the processing of the input data in accordance with a predefined operating rule or the AI model stored in the non-volatile memory and the volatile memory. The predefined operating rule or artificial intelligence model is provided through training or learning.

Here, being provided through learning may refer, for example, to, by applying a learning process to a plurality of learning data, a predefined operating rule or AI model of a desired characteristic being made. The learning is performed in a device itself in which AI according to an embodiment is performed, and/or is implemented through a separate server/system.

The AI model may include a plurality of neural network layers. Each layer has a plurality of weight values and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), Deep Belief Network (DBN), bidirectional recurrent deep neural network (BRDNN), Generative Adversarial Networks (GAN), and deep Q-networks, or the like.

The learning process may include a method for training a predetermined target device (for example, a robot) using a plurality of learning data to cause, allow, or control the target device to make a determination or prediction. Examples of learning processes include, but are not limited to, supervised learning, unsupervised learning, semi-supervised learning, or reinforcement learning.

Figure 3:
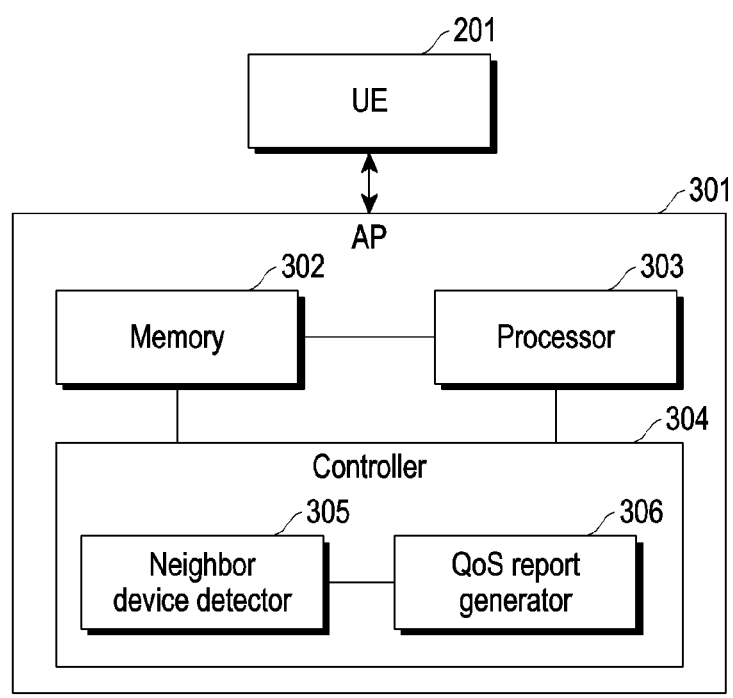
FIG. 3 is a block diagram illustrating an example configuration of an AP, according to various embodiments.

FIG. 3 is a block diagram illustrating an example configuration of the AP (301), according to various embodiments.

The AP (301) includes a memory (302) storing a plurality of applications, a processor (e.g., including processing circuitry) (303), and a controller (e.g., including control/processing circuitry) (304) communicatively coupled to the memory and the processor. The controller (304) receives a plurality of parameters from the plurality of devices available in the wireless network. The controller (304) determines the QoS report based on the plurality of parameters received from the plurality of devices. The AP (301) sends the QoS report to the UE (201) for managing the QoS of the applications in the wireless network.

The memory (302) is configured to store instructions to be executed by the processor (303). The memory (302) includes non-volatile storage elements. Examples of such non-volatile storage elements includes magnetic hard discs, optical discs, floppy discs, flash memories, or forms of EPROM or EEPROM memories. In addition, the memory (302) is considered for example, a non-transitory storage medium. The term "non-transitory" indicates that the storage medium is not embodied in a carrier wave or a propagated signal. The term "non-transitory" is not be interpreted that the memory (302) is non-movable. In various examples, the memory (302) is configured to store larger amounts of information. In certain examples, a non-transitory storage medium stores data that may, over time, change (e.g., in RAM or cache).

The processor (303) includes one or a plurality of processors. The one or the plurality of processors is a general-purpose processor, such as a CPU, an AP, or the like, a graphics processing unit such as a GPU, a VPU, and/or an AI-dedicated processor such as an NPU. The processor (303) includes multiple cores and is configured to execute the instructions stored in the memory (302).

In an embodiment, the controller (304) includes a neighbor device detector (305) and a QoS report generator (306), each of which may include various processing circuitry and/or executable program instructions. The neighbor device detector (305) receives a plurality of parameters from the plurality of devices available in the wireless network. The QoS report generator (306) generates the QoS report based on the plurality of parameters received from the plurality of devices. The QoS report includes usage pattern of each device in the wireless network, a list of active devices from the plurality of devices, a list of inactive devices from the plurality of devices, a metadata of data traffic associated with the list of active devices, and a metadata data traffic associated with a list of inactive devices, Also the QoS report includes but not limited to unique tuple for connection identification and the user priority (UP). The unique tuple is the <IP_VERSION, Transport_protocol, Dest IP, Dest Port, Src IP, Src Port>. The AP (301) receives a request message for the QoS report from the UE in the wireless network. The AP (301) sends the QoS report to the UE (201) for managing the QoS of the applications in the wireless network, where the metadata represents the information about the traffic types.

The controller (304) may be implemented by processing circuitry such as logic gates, integrated circuits, microprocessors, microcontrollers, memory circuits, passive electronic components, active electronic components, optical components, hardwired circuits, or the like, and optionally be driven by firmware. The circuits for example, be embodied in one or more semiconductor chips, or on substrate supports such as printed circuit boards and the like.

At least one of the plurality of modules/components of the AP controller (304) is implemented through an AI model. A function associated with the AI model is performed through the memory (302) and the processor (303). The one or a plurality of processors controls the processing of the input data in accordance with a predefined operating rule or the AI model stored in the non-volatile memory and the volatile memory. The predefined operating rule or artificial intelligence model is provided through training or learning.

Here, being provided through learning may refer, for example to, by applying a learning process to a plurality of learning data, a predefined operating rule or AI model of a desired characteristic being made. The learning is performed in a device itself in which AI according to an embodiment is performed, and/or is implemented through a separate server/system.

The AI model may include a plurality of neural network layers. Each layer has a plurality of weight values and performs a layer operation through calculation of a previous layer and an operation of a plurality of weights. Examples of neural networks include, but are not limited to, CNN, DNN, RNN, RBM, DBN, BRDNN, GAN, and deep Q-networks, or the like.

The learning process may include a method for training a predetermined target device (for example, a robot) using a plurality of learning data to cause, allow, or control the target device to make a determination or prediction. Examples of learning processes include, but are not limited to, supervised learning, unsupervised learning, semi-supervised learning, or reinforcement learning.

Figure 4:
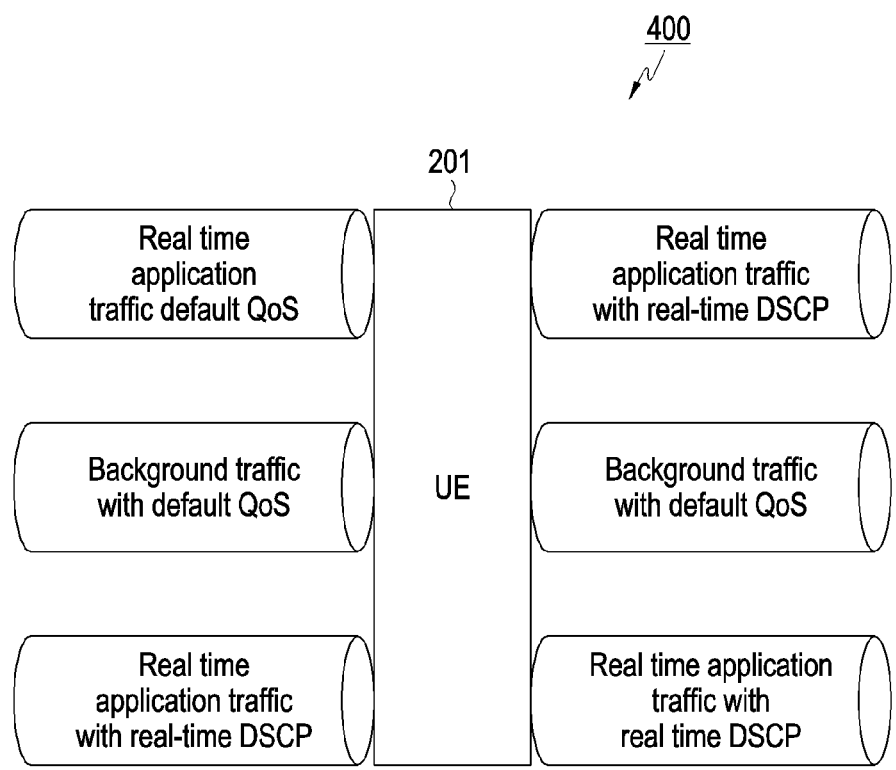
FIG. 4 is a diagram illustrating the UE managing data traffic of applications, according to various embodiments.

FIG. 4 is a diagram (400) illustrating the UE (201) managing data traffic of applications, according to various embodiments.

When the UE (201) faces the real time application traffic default QoS, the UE (201) setting the appropriate DSCP with respect to the real time application traffic.

According to an embodiment, when the application of the UE (201) facing gaming/video traffic in real-time with improper EDCA function, the gaming/video traffic of the application translates to the high-priority access category.

According to an embodiment, when the application of the UE (201) facing real-time data traffic with proper EDCA function, ignoring the translation and continue the data traffic with the same access category of the data structure.

According to an embodiment, when the application of the UE (201) facing download traffic in foreground, the download traffic is in BE access category of the data structure.

According to an embodiment, by default the download traffic is in best-effort access category. However, when the application of the UE (201) facing real-time download traffic in the foreground, the real-time download traffic is translated to the BK access category of the data structure to improve the latency drastically of real-time video calling or gaming applications.

According to an embodiment, few non-real time data traffic is set to video access category/voice access category as EDCA function. The UE (201) monitors such connections and sets appropriate EDCA function (BE or BK)

According to an embodiment, when the UE (201) facing any data traffic in any critical applications, the UE (201) detects critical data traffic and when the critical traffic is not set to high priority access category, the critical data traffic translates to the high priority access category (video/voice access category).

According to an embodiment, when the UE (201) facing top-most priority application for the particular time period, the data traffic of the top-most priority application translates to the high priority access category of the data structure.

According to an embodiment, when the other application of the UE (201) facing other traffic like chat, surfing, etc., the other traffic is set as BE access category.

Figure 5:
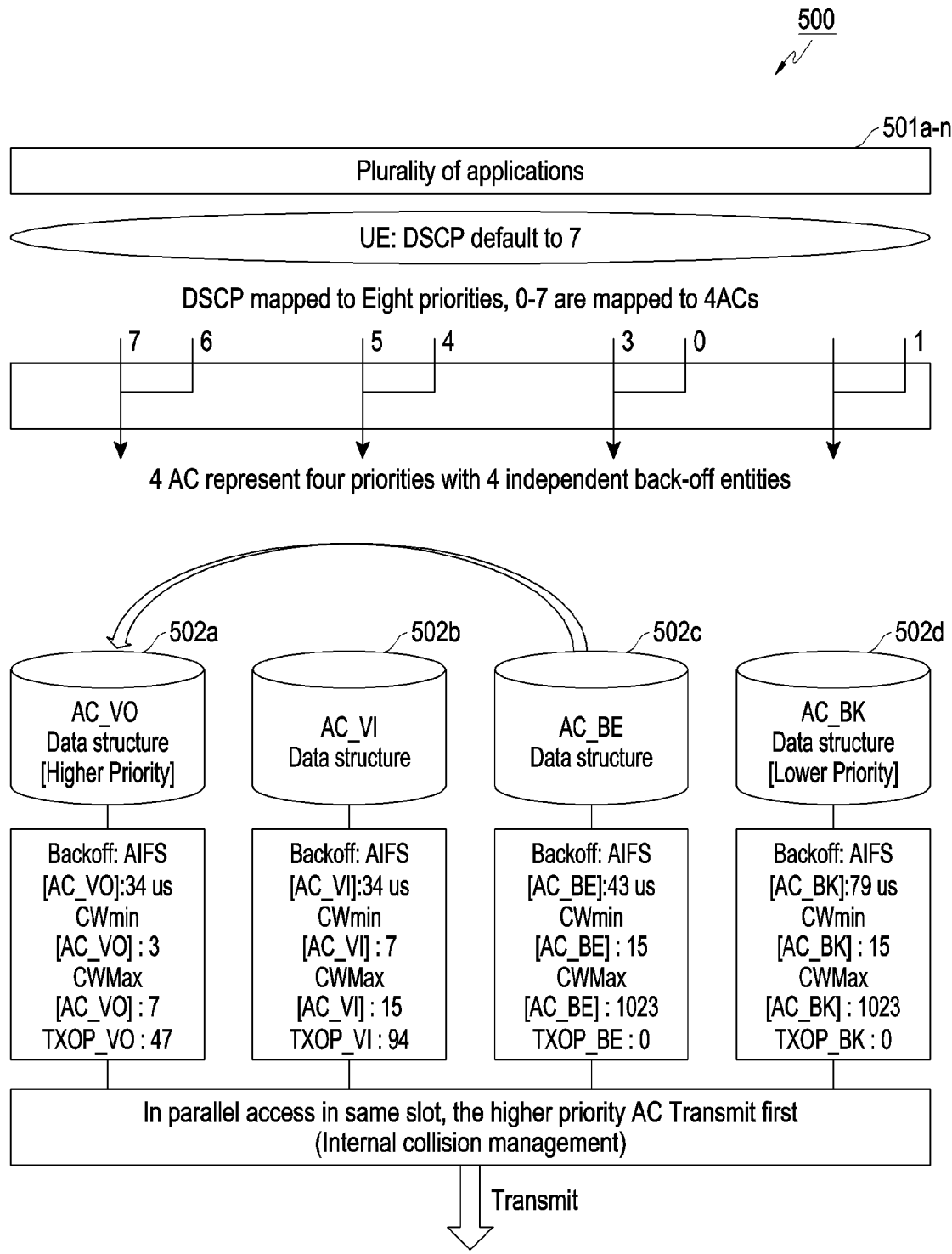
FIG. 5 is a diagram illustrating translation of a non-priority data traffic to a high-priority access category of the data structure, according to various embodiments.

FIG. 5 is a diagram (500) illustrating translation of the non-priority data traffic to the high-priority access category of the data structure, according to various embodiments.

The plurality of applications ($501_{a-n}$) is used by the UE (201) and detects the plurality of data traffic of the plurality of applications ($501_{a-n}$) based on current activities of the UE (201), hardware components of the UE (201), a plurality traffic parameter, a QoS report received from the AP (301) associated with the UE (201) in the wireless network. The plurality of data traffic has an association with the data structure of the plurality of data structures of the UE (201).

The UE (201) detects the EDCA function based on the plurality of data traffic. The EDCA function includes the current mapping between the access category of each data structure and a traffic category of each data traffic of the plurality of data traffic based on the association. The UE (201) classifies the plurality of data traffic of the plurality of applications into a priority data traffic category and a non-priority data traffic category based on the current mapping of the EDCA function. The UE (201) modifies the current mapping of the EDCA function based on the priority data traffic category, the non-priority data traffic category, and the access category of each data structure of the plurality of data structures.

For example, the UE (201) upgrades the current mapping of the EDCA function by translating the priority data traffic category from the best-effort access category (BE_AC) of the current data structure (502c) to another data structure (502a) that having the voice access category (AC_VO), when the access category of the current data structure (502c) indicates the best-effort access category (BE_AC). Similarly, the UE (201) downgrades the current mapping of the EDCA function by translating the data traffic of the non-priority data traffic category from the voice access category (AC_VO) of the current data structure (502a) to the best-effort access category (BE_AC) of another data structure (502c), when the access category of the current data structure indicates the voice access category (AC_VO).

According to an embodiment, referring to FIG. 5, for example, the certain data structure of the plurality of data structures are configured with the priority access category and certain data structure of the plurality of data structures are configured with the non-priority access category. The priority access category is voice access category (AC_VO) of the data structure (502a) and video access category (AC_VI) of the data structure (502b) and non-priority access category are best-effort access category (BE_AC) of the data structure (502c) and background access category (BK_AC) of the data structure (502d).

The voice access category (AC_VO) of the data structure (502a) has independent back-off entities like Arbitration Inter-Frame Spacing (AIFS) [AC_VO]: 34 μs, CWmin [AC_VO]: 3, CWMax [AC_VO]: 7, TXOP_VO: 47.

The video access category (AC_VI) of the data structure (502b) has independent back-off entities like AIFS [AC_VI]: 34 μs, Contention Window Minimum (CWmin) [AC_VI]: 7, Contention Window Maximum (CWMax) [AC_VI]: 15, Transmission opportunity (TXOP)_VI: 94.

The BE_AC of the data structure (502c) independent back-off entities like AIFS [AC_BE]:43 μs, CWmin [AC_BE]: 15, CWMax [AC_BE]: 1023, TXOP_BE: 0.

The BK_AC of the data structure (502d) as independent back-off entities like AIFS [AC_BK]: 79 μs, CWmin [AC_BK]: 15, CWMax [AC_BK]: 1023, TXOP_BK: 0.

The UE (201) classifies the data traffic into different access categories for example, AC_VO, AC_VI, BE_AC, and BK_AC. Also, the UE (201) determines the application traffic but priority is not set as optimal by the application (501). Hence, by default the application runs as the AC_BE.

The UE (201) translates the application traffic from AC_BE to AC_VO, hence faster access to Wi-Fi medium is achieved through better interface spacing (43 μs to 34 μs), best contention window (starting from 0-3 and end up with 7 on retransmission rather than starting 0-15 and end up with 1023), TXOP for burst of traffic. Hence, the plurality of applications ($501_{a-n}$) traffic becomes more reliable, faster and continue most of the application traffic as User Datagram Protocol (UDP) rather than Transmission Control Protocol (TCP) with overhead and plurality of applications ($501_{a-n}$) latency is improved by this technique. For example, the plurality of applications ($501_{a-n}$) is gaming application, or other applications. When the other real-time data traffic such as video calling is going on UE (201) or across the network, the UE (201) determines and translates the plurality of applications ($501_{a-n}$) traffic accordingly. The translation is performed based on changing the DSCP value, where the DSCP value is mapped to the user priority numbers (0-8). Once the DSCP value is changed, the user priority numbers also change accordingly. For example, when the best-effort access category (BE_AC) faces a high priority data traffic, the DSCP value of the high priority data traffic is changed to translate the application from the best-effort access category (BE_AC) to the voice access category (AC_VO), where the user priority number is changed with respect to change in DSCP value. Once the user priority number 0 is changed to 7, the application is translated from the BE_AC to the AC_VO.

Figure 6:
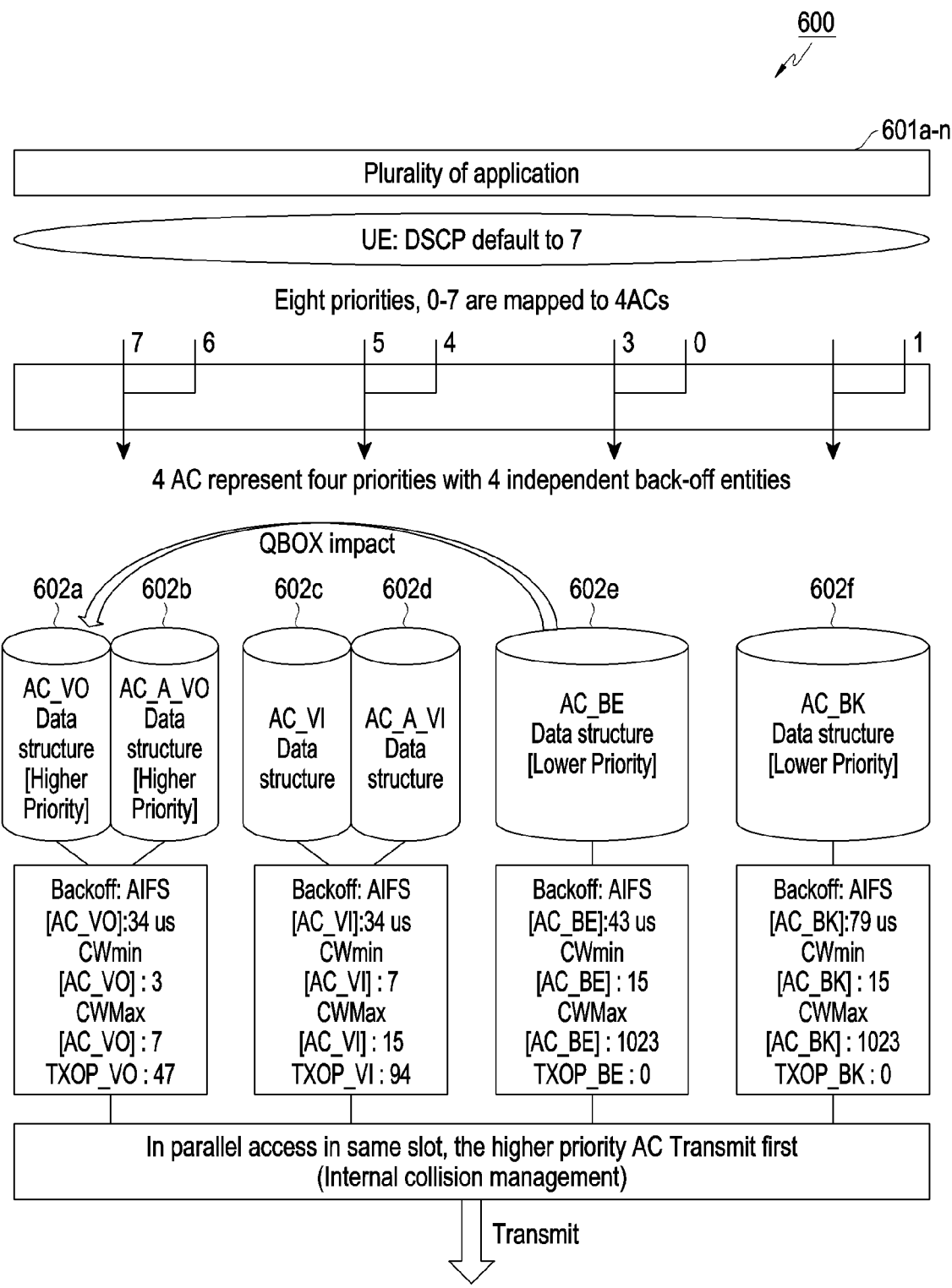
FIG. 6 is a diagram illustrating the translation of the non-priority data traffic to a plurality of high-priority access category of the data structure, according to various embodiments.

FIG. 6 is a diagram (600) illustrating translation of the non-priority data traffic to the plurality of high-priority access category of the data structure, according to various embodiments.

According to various embodiments, referring to FIG. 6, for example, the certain data structure of the plurality of data structures are configured with the priority access category and certain data structure of the plurality of data structures are configured with the non-priority access category. The priority access category is AC_VO of the data structures (602a) and alternate voice access category (AC_A_VO) of the data structure (602b) and AC_VI of the data structures (602c) and alternate video access category (AC_A_VI) of the data structure (602d). The non-priority access category is BE_AC of the data structure (602e) and BK_AC of the data structure (602f).

The AC_VO of the data structure (602a) and AC_A_VO of the data structure (S602b) has independent back-off entities like AIFS [AC_VO]: 34 μs, CWmin [AC_VO]: 3, CWMax [AC_VO]: 7, TXOP_VO: 47.

The AC_VI of the data structure (602c) and AC_A_VI of the data structure (602d) has independent back-off entities like AIFS [AC_VI]: 34 μs, CWmin [AC_VI]: 7, CWMax [AC_VI]: 15, TXOP_VI: 94.

The best-effort access category (BE_AC) of the data structure (602e) independent back-off entities like AIFS [AC_BE]:43 μs, CWmin [AC_BE]: 15, CWMax [AC_BE]: 1023, TXOP_BE: 0.

The BK_AC of the data structure (602f) as independent back-off entities like AIFS [AC_BK]: 79 μs, CWmin [AC_BK]: 15, CWMax [AC_BK]: 1023, TXOP_BK: 0.

The plurality of applications ($601_{a-n}$) is used by the UE (201) and detects the plurality of data traffic of the plurality of applications ($601_{a-n}$) based on current activities of the UE (201), hardware components of the UE (201), a plurality traffic parameter, a QoS report received from the AP (301) associated with the UE (201) in the wireless network. The plurality of data traffic has an association with the data structure of the plurality of data structures of the UE (201).

The UE (201) detects the EDCA function based on the plurality of data traffic. The EDCA function includes the current mapping between the access category of each data structure and a traffic category of each data traffic of the plurality of data traffic based on the association. For example, when the priority data traffic category sends through the BE_AC, the priority data traffic category is translating to the AC_VO of the data structures (602a) and AC_A_VO of the data structures (602b).

Referring to FIG. 6, the AC_A_VO of the data structure (602a) and the AC_A_VI of the data structure (602b) shares the same EDCA function as AC_VI and AC_VO. So higher UP are selected with higher probability than data structure with lower UP. The UE (201) determines the application traffic but priority is not set as optimal by application, hence by default the application running as AC_BE.

The UE (201) translates the application traffic from the AC_BE to AC_VO or AC_A_VO, hence faster access to Wi-Fi medium is achieved through better interface spacing (43 μs to 34 μs), best contention window (starting from 0-3 and end up with 7 on retransmission rather than starting 0-15 and end up with 1023), Transmit opportunity (TXOP) for burst of traffic. Hence, the application traffic becomes more reliable, faster, and continue most of the traffic as UDP rather than TCP with overhead.

Referring to FIG. 6, once the DSCP value is changed, the user priority numbers also change accordingly. For example, when the best-effort access category (BE_AC) faces a high priority data traffic, the DSCP value of the high priority data traffic is changed to translate the application from the best-effort access category (BE_AC) to the AC_VO or AC_A_VO, where the user priority number is changed with respect to change in DSCP value. Once the user priority number 0 is changed to 7, the application is translated from the BE_AC to the AC_VO or AC_A_VO.

Figure 7:
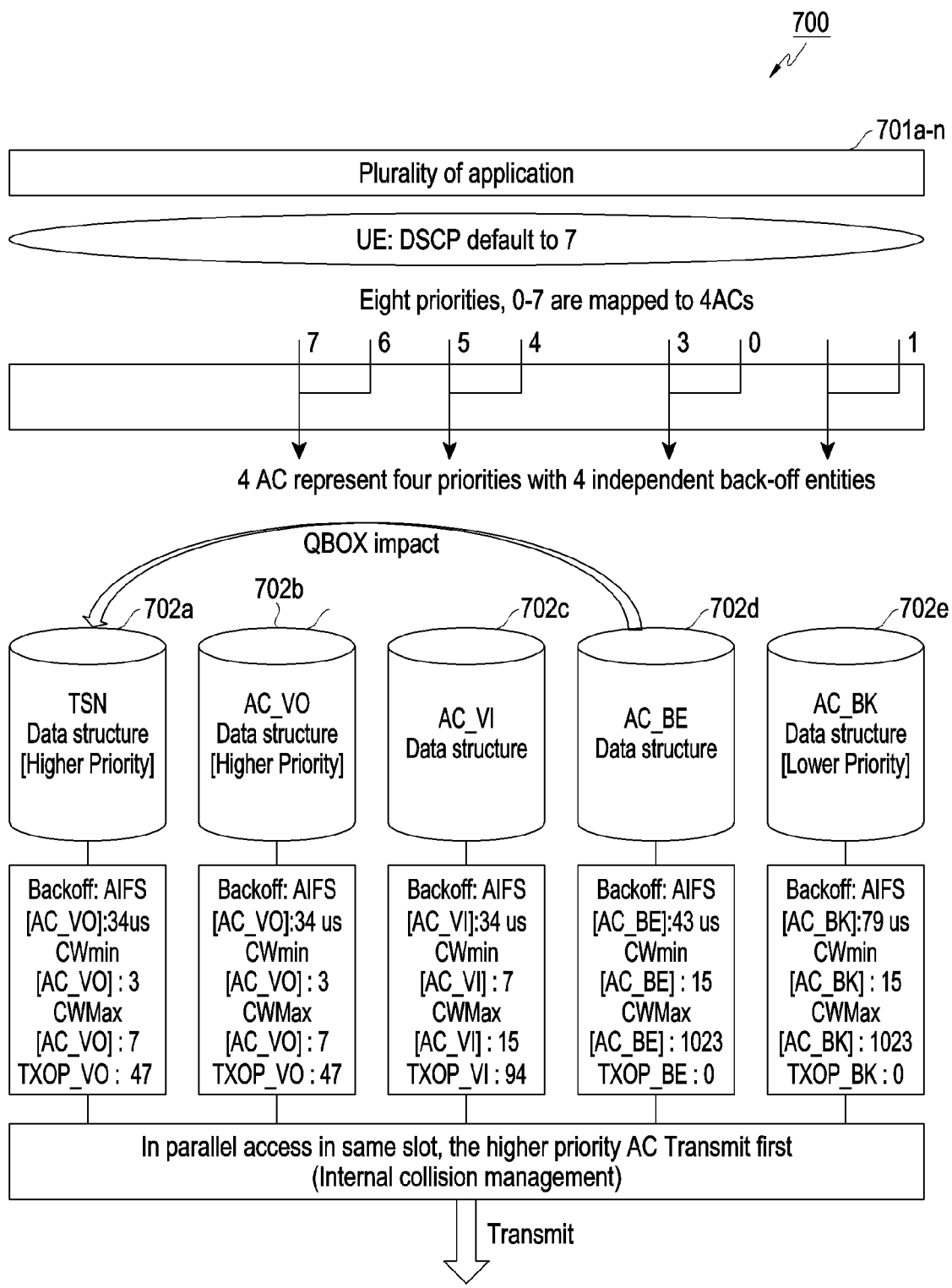
FIG. 7 is a diagram illustrating the translation of the non-priority data traffic to a time-sensitive networking (TSN) data structure, according to various embodiments.

FIG. 7 is a diagram (700) illustrating translation of the non-priority data traffic to a Time-Sensitive Networking (TSN) data structure (702a), according to various embodiments.

According to various embodiments, the plurality of applications ($701_{a-n}$) is used by the UE (201) and detects the plurality of data traffic of the plurality of applications ($701_{a-n}$) based on current activities of the UE (201), hardware components of the UE (201), a plurality traffic parameter, a QoS report received from the AP (301) associated with the UE (201) in the wireless network. The plurality of data traffic has an association with the data structure of the plurality of data structures of the UE (201).

The UE (201) detects the EDCA function based on the plurality of data traffic. The EDCA function includes the current mapping between the access category of each data structure and a traffic category of each data traffic of the plurality of data traffic based on the association. The UE (201) classifies the plurality of data traffic of the plurality of applications into a priority data traffic category and a non-priority data traffic category based on the current mapping of the EDCA function. The UE (201) modifies the current mapping of the EDCA function based on the priority data traffic category, the non-priority data traffic category, and the access category of each data structure of the plurality of data structures.

According to an embodiment, referring to FIG. 5, for example, the certain data structure of the plurality of data structures are configured with the priority access category and certain data structure of the plurality of data structures are configured with the non-priority access category. The priority access category is TSN access category (AC_TSN) of the data structure (702a), the AC_VI of the data structure (702c) and the AC_VO of the data structure (702b). The non-priority access category is BE_AC of the data structure (502c) and BK_AC of the data structure (502d).

For example, the UE (201) upgrades the current mapping of the EDCA function by translating the priority data traffic category from the BE_AC of the current data structure (702d) to another data structure (702a) that having the TSN access category (AC_TSN), when the access category of the current data structure (702d) indicates the BE_AC. Similarly, the UE (201) downgrades the current mapping of the EDCA function by translating the data traffic of the non-priority data traffic category from the AC_TSN of the current data structure (702a) to the BE_AC of another data structure, (702d), when the access category of the current data structure indicates the AC_TSN.

The AC_TSN of the data structure (702a) has independent back-off entities like Arbitration Inter-Frame Spacing (AIFS) [AC_VO]: 34 µs, CWmin [AC_VO]: 3, CWMax [AC_VO]: 7, TXOP_VO: 47.

The AC_VO of the data structure (702b) has independent back-off entities like Arbitration Inter-Frame Spacing (AIFS) [AC_VO]: 34 µs, CWmin [AC_VO]: 3, CWMax [AC_VO]: 7, TXOP_VO: 47.

The AC_VI of the data structure (702c) has independent back-off entities like AIFS [AC_VI]: 34 µs, CWmin [AC_VI]: 7, CWMax [AC_VI]: 15, TXOP_VI: 94.

The BE_AC of the data structure (702d) independent back-off entities like AIFS [AC_BE]:43 µs, CWmin [AC_BE]: 15, CWMax [AC_BE]: 1023, TXOP_BE: 0.

The BK_AC of the data structure (702e) as independent back-off entities like AIFS [AC_BK]: 79 µs, CWmin [AC_BK]: 15, CWMax [AC_BK]: 1023, TXOP_BK: 0.

The UE (201) classifies the data traffic into different access categories for example, AC_TSN, AC_VO, AC_VI, BE_AC, and BK_AC.

According to various embodiments, when the access category by EDCA function is not sufficient for fine control of real-time plurality of applications (701$_{a-n}$), another data structure is incorporating new access category with highest priority for time sensitive traffic based on obtained TXOP.

The UE (201) determines the application traffic but priority is not set as optimal by the plurality of applications (701$_{a-n}$). Hence, by default the application runs as the AC_BE. The UE (201) translates application (701) traffic from the AC_BE to the AC_TSN, hence fastest access to Wi-Fi medium is achieved (even if any kind of ongoing traffic to backoff) through better interface spacing (43 µs to 16 µs), no contention window (immediate access), TXOP for burst of traffic. Hence the application (701) traffic becomes more reliable, faster, and continue most of the gaming traffic as UDP rather than TCP with overhead. The UE (201) applies to these new QoS addition changes in in the upcoming UE for improved application performance and critical applications.

Referring to FIG. 7, once the DSCP value is changed, the user priority numbers also change accordingly. For example, when the best-effort access category (BE_AC) faces a high priority data traffic, the DSCP value of the high priority data traffic is changed to translate the application from the best-effort access category (BE_AC) to the TSN access category of the data structure, where the user priority number is changed with respect to change in DSCP value. Once the user priority number 0 is changed to 7, the application is translated from the BE_AC to the TSN access category of the data structure.

Figure 8:
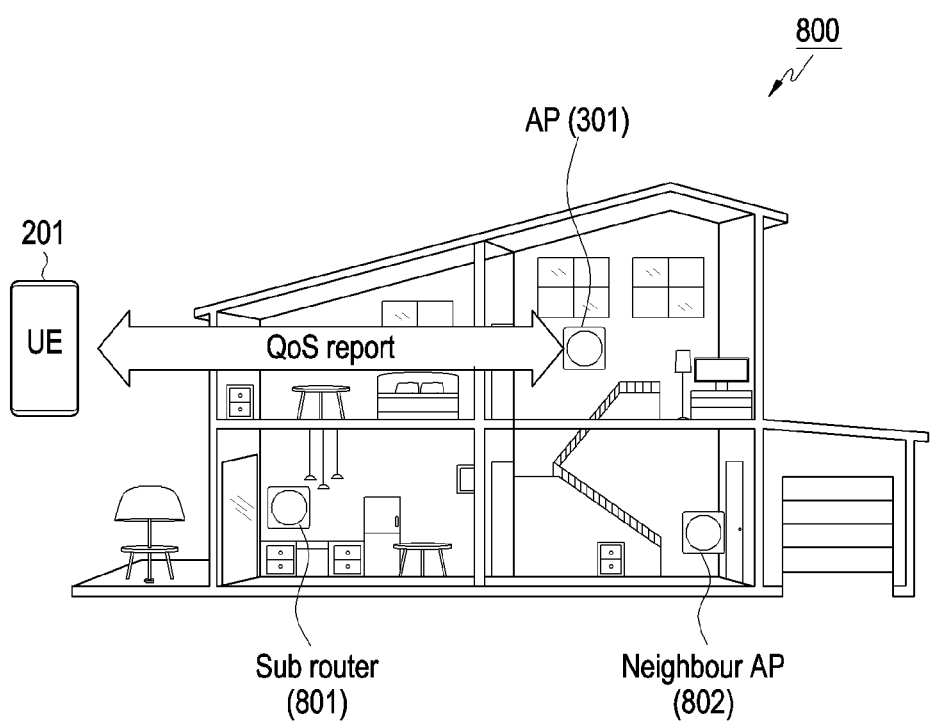
FIG. 8 is a diagram illustrating communication between the UE and the AP, according to various embodiments.

FIG. 8 is a diagram (800) illustrating communication between the UE and the AP, according to various embodiments.

For example, in home environment, the plurality of devices (neighbour AP (802), sub-router (801) and the like) are connected to the AP (301). The AP (301) detects the plurality of devices neighbour devices available in the wireless network. The AP (103) generating a QoS report based on the plurality of parameters received from the plurality of devices. The QoS report includes wireless network usage pattern by each device of the plurality of devices, the list of active devices from the plurality of devices, the list of inactive devices from the plurality of devices, the metadata of data traffic associated with the list of active devices, and the metadata data traffic associated with the list of inactive devices. The AP (301) receives the request message for the QoS report from the UE (201) in the wireless network. The AP (301) sending the QoS report to the UE for managing the QoS of the applications in the wireless network.

Once the UE (201) receives the QoS report from the AP (301), the UE (201) determines the plurality of traffic among the plurality of devices in the wireless network and translating the priority data traffic category from the best-effort access category (BE_AC) of the current data structure to another data structure that having the voice access category (AC_VO), when the access category of the current data structure indicates the best-effort access category (BE_AC). Similarly, the UE (201) downgrades the current mapping of the EDCA function by translating the data traffic of the non-priority data traffic category from the voice access category (AC_VO) of the current data structure to the best-effort access category (BE_AC) of another data structure, when the access category of the current data structure indicates the voice access category (AC_VO).

Figure 9:
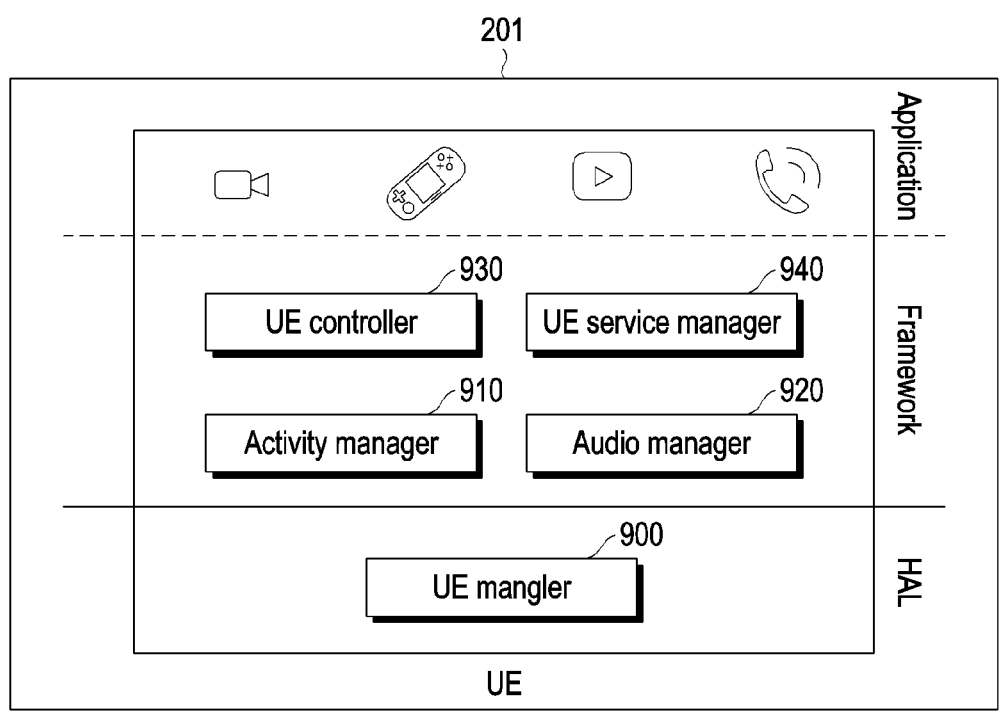
FIG. 9 is a block diagram illustrating an example configuration of the UE for managing data traffic of the applications, according to various embodiments.

FIG. 9 is a block diagram illustrating an example configuration of the UE (201) for managing data traffic of the applications, according to various embodiments.

According to an embodiment, architecture of the UE (201) includes a hardware abstraction layer (HAL), a framework layer, and an application layer. The HAL layer includes the UE mangler (900). The framework layer includes an activity manager (910), an audio manager (920), a UE controller (930), and a UE service manager (940). The UE controller (930) uses the Wi-Fi framework to determine the connectivity and Wi-Fi characteristics (Bands, Frequency, link speed). The UE controller (930) uses the activity manager (910) to determine the running application traffic. The UE controller (930) checks the audio manager (920) to determine whether any active application is accessing the Mic and camera of the UE (201). When the active application is accessing the Mic and camera of the UE (201), the specific application is categorized as the video calling application. The UE controller (930) uses activity manager (910) and fetches the information of the specific application. When the application is under gaming category, the specific application classifies as the gaming application and sends the categorized information to the UE service manager (940).

The UE service manager (940) retrieves an application ID information and passes down the traffic to be upgraded to the UE Mangler (900). The UE Mangler (900) detects the real-time traffic amongst the allowed UID list. When the real-time traffic is not set with proper EDCA function, the UE Mangler (900) upgrades the EDCA function and the upgraded real-time traffic performs better than the default Best effort traffic.

According to an embodiment, the UE controller (930) uses a deep packet inspection module to determine the type of service, when the UE (201) communicating with the AP (301).

According to an embodiment, when the UE (201) communicates with a cellular network, the UE controller (930) uses a deep packet inspection module to classify application traffic by inspecting packet using different techniques like IP, Port, payload size, packet inter-arrival times, flow rate and categorizes traffic into Multimedia, telephony, latency oriented, bulk traffic, telephony, real-time interactive and default/low-priority. The UE service manager (940) derives the appropriate DSCP value for the traffic associated with the application ID and sends the derived DSCP field to the UE Mangler (900) along with application ID, where the application ID is like ID related to voice application, ID related to video application etc.

The UE Mangler (900) checks if valid DSCP is assigned to the packets and updates the DSCP byte in IP header to the new value if APP assigned value to not appropriate. The UE service manager (940) monitors for packet loss rate and error packets for each connection. The UE service manager (940) dynamically updates (passes new DSCP value to the UE mangler (900)) the DSCP byte to new DSCP value or default DSCP value, when the packet drops or high retransmissions are observed.

Figure 10:
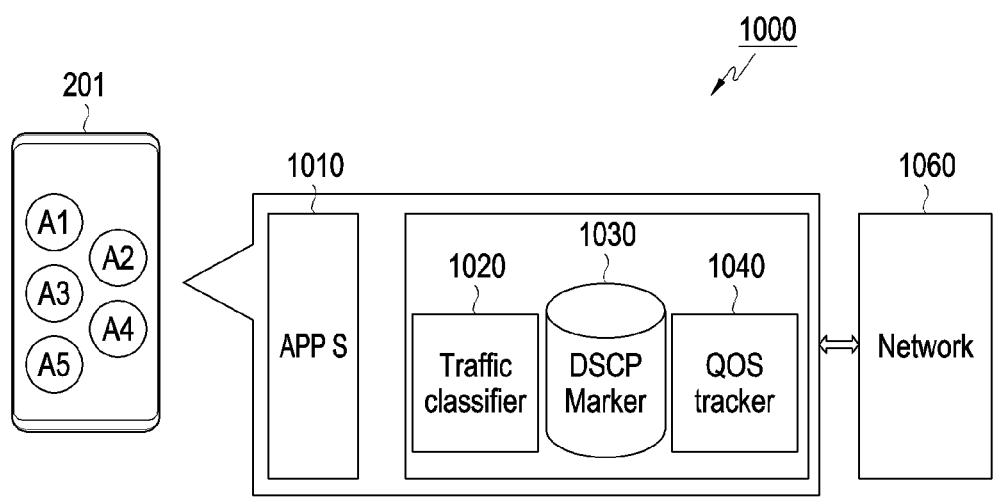
FIG. 10 is a diagram illustrating a classification of the data traffic and marking DSCP value, according to various embodiments.

FIG. 10 is a diagram (1000) illustrating classification of the data traffic and marking DSCP value, according to various embodiments.

A dedicated DSCP value is recommended for type of traffic. The recommendations are made for network administrators including mobile operators to configure QoS policies for different types of traffic. The UE (201) receiving the plurality of applications (1010) from the network (1060) and detects the type of data traffic (traffic is video call, multimedia, Real time, Throughput oriented etc.) being generated by the application. After that, the UE (201) check whether the appropriate DSCP value is set for that type of traffic or not. When the DSCP value is not set, the DSCP value is modified to the proper value. Once the DSCP value is modified, the UE (201) checks whether there is a drop in QoS or not due to newly set DSCP value. When the drop occurs in QoS, the UE (201) modifies the DSCP value back to the old DSCP value.

According to an embodiment, a traffic classifier (1020) classifies the data traffic among the plurality of application by inspecting packet using different techniques like IP, Port, size of the packet, packet inter-arrival times and using statistical filters. A DSCP marker (1030) of the UE (201) detects the IP header of each data traffic whether the DSCP value of each data traffic is not set or is set to a default DSCP value using socket option. The DSCP value in the IP header of the data traffic is set to appropriate DSCP value, when the category of the data traffic is the priority data traffic category. Similarly, the DSCP value in the IP header of the data traffic is not modified, when the category of the data traffic is the non-priority data traffic category.

Once the DSCP value in the IP header of the data traffic is set to appropriate DSCP value, when the category of the data traffic is the priority data traffic category, the QoS tracker (1040) detects whether the drop in QoS or not. When the drop in the QoS is detected, the UE (201) modifies the DSCP value back to the old DSCP value.

According to an embodiment, the QoS tracker (1040) monitoring a packet loss rate and an error packet for each data traffic of the plurality of data traffic based on allocated DSCP value. The QoS tracker (1040) determines a drop in the QoS for the data traffic classified into the priority data traffic category and the non-priority data traffic category based on the packet loss rate and the error packets. The UE (201) modifies the DSCP value for the data traffic classified into the priority data traffic category and the non-priority data traffic category back to the detected DSCP value, when the drop in the QoS is determined.

The DSCP byte in the IP header may be used for setting QoS and the DSCP value includes 4 forwarding Per-Hop Behaviour (PHB) and multiple service classes based on traffic type.

Default forwarding (DF)=>Best effort traffic
Expedited forwarding (EF)=>Low-loss, low-latency traffic
Assured forwarding (AF)=>Assurance of delivery under prescribed conditions
Class selector (CS)=>For backward compatibility with the IP precedence field.

The higher DSCP value gets higher precedence over other traffic like for voice communications internet protocol (VoIP) traffic to get higher priority it is set with DSCP value EF.

Figure 11:
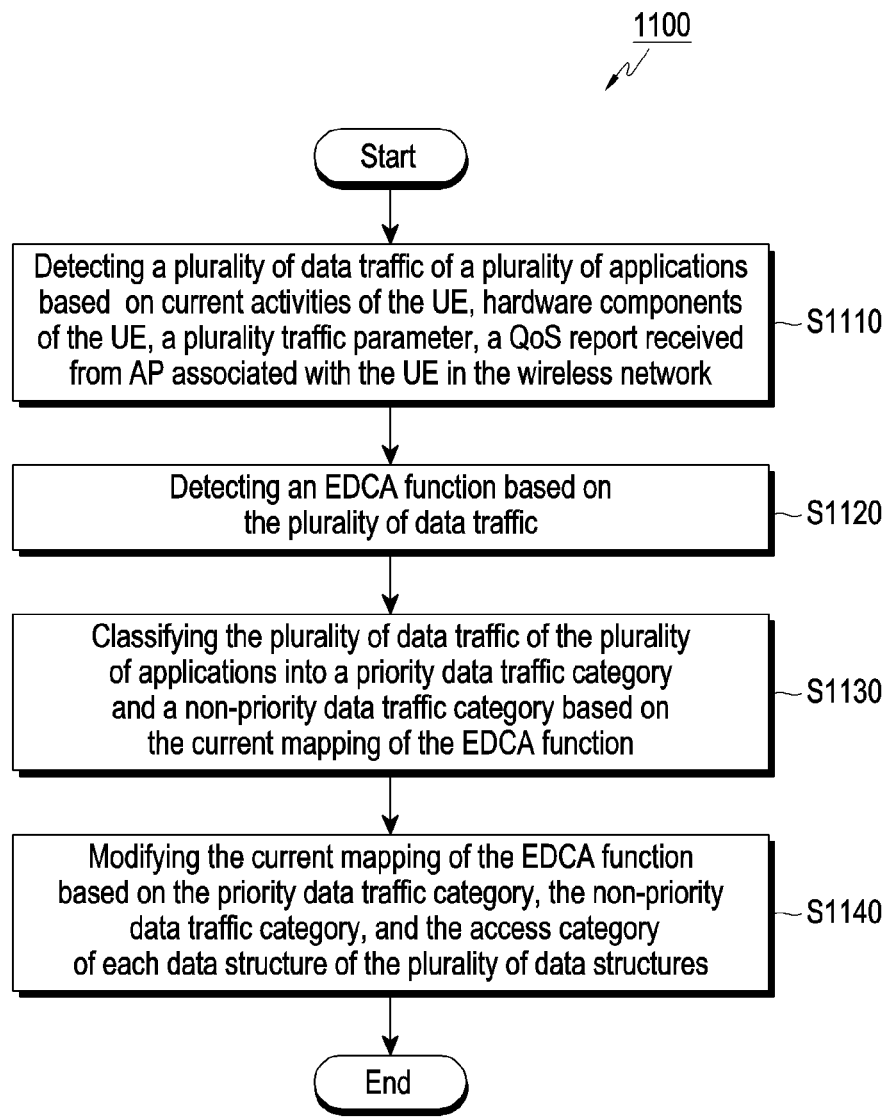
FIG. 11 is a flowchart illustrating an example method for managing a QoS of applications in a wireless network, according to various embodiments.

FIG. 11 is a flowchart (1100) illustrating an example method for managing the QoS of applications in the wireless network, according to various embodiments.

At S1110, the method includes detecting the plurality of data traffic of the plurality of applications based on current activities of the UE, hardware components of the UE, a plurality traffic parameters, and the QoS report received from AP associated with the UE in the wireless network. Each data traffic of the plurality of data traffic has the association with the data structure of the plurality of data structures of the UE.

At S1120, the method includes detecting the EDCA function based on the plurality of data traffic. The EDCA function includes the current mapping between the access category of each data structure and the traffic category of each data traffic of the plurality of data traffic based on the association.

At S1130, the method includes classifying the plurality of data traffic of the plurality of applications into the priority data traffic category and the non-priority data traffic category based on the current mapping of the EDCA function.

At S1140, the method includes modifying the current mapping of the EDCA function based on the priority data traffic category, the non-priority data traffic category, and the access category of each data structure of the plurality of data structures.

The various actions, acts, blocks, steps, or the like in the method may be performed in the order presented, in a different order or simultaneously. Further, in various embodiments, some of the actions, acts, blocks, steps, or the like may be omitted, added, modified, skipped, or the like without departing from the disclosed method.

Figure 12:
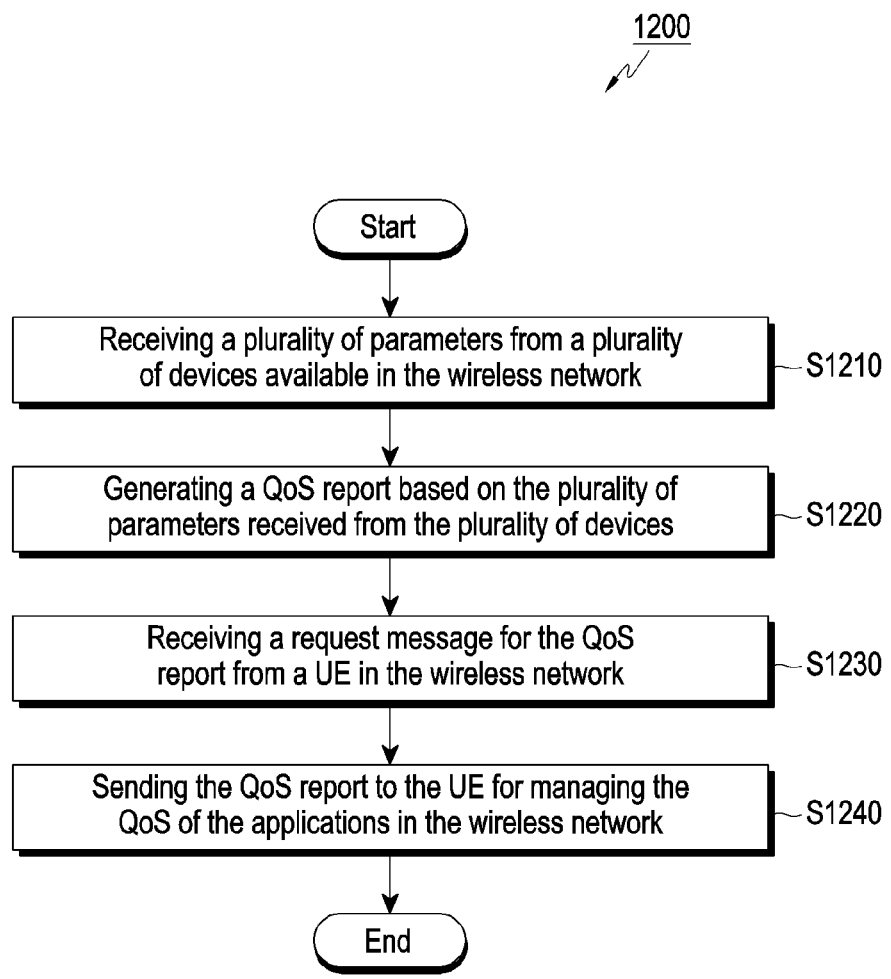
FIG. 12 is a flowchart illustrating an example method for sending a QoS report to the UE for managing the QoS of applications in the wireless network, according to various embodiments.

FIG. 12 is a flowchart (1200) illustrating an example method for sending the QoS report to the UE (201) for managing the QoS of applications in the wireless network, according to various embodiments.

At S1210, the method includes receiving the plurality of parameters from the plurality of devices available in the wireless network.

At S1220, the method includes generating a QoS report based on the plurality of parameters received from the plurality of devices. The QoS report includes the wireless network usage pattern by each device of the plurality of devices, the list of active devices from the plurality of devices, the list of inactive devices from the plurality of devices, the metadata of data traffic associated with the list of active devices, and the metadata data traffic associated with the list of inactive devices.

At S1230, the method includes receiving a request message for the QoS report from a UE in the wireless network.

At S1240, the method includes sending the QoS report to the UE for managing the QoS of the applications in the wireless network The various actions, acts, blocks, steps, or the like in the method may be performed in the order presented, in a different order or simultaneously. Further, in various embodiments, some of the actions, acts, blocks, steps, or the like may be omitted, added, modified, skipped, or the like without departing from the scope of the disclosed method.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method for managing a quality of service (QoS) of applications in a wireless network, the method comprising:
   detecting, by a user equipment (UE), a plurality of data traffic of a plurality of applications, wherein each data traffic of the plurality of data traffic has an association with at least one data structure of a plurality of data structures of the UE;
   detecting, by the UE, an enhanced distributed channel access (EDCA) function based on the plurality of data traffic, wherein the EDCA function comprises a mapping between an access category of each data structure and a traffic category of each data traffic of the plurality of data traffic based on the association;
   classifying, by the UE, the plurality of data traffic of the plurality of applications into a priority data traffic category and a non-priority data traffic category based on the mapping; and
   modifying, by the UE, the mapping based on the priority data traffic category, the non-priority data traffic category, and the access category.

2. The method of claim 1, wherein modifying, by the UE, the mapping based on the priority data traffic category, the non-priority data traffic category, and the access category comprises:
   detecting, by the UE, at least one current data structure of the plurality of data structures associated with at least one data traffic of the plurality of data traffic classified into the priority data traffic category;
   detecting, by the UE, an access category of the at least one current data structure as one of a priority access category and a non-priority access category; and
   upgrading, by the UE, the mapping by translating the at least one data traffic classified into the priority data traffic category from the at least one current data structure to at least one another data structure of the plurality of data structures having the priority access category, based on the access category of the at least one current data structure indicating the non-priority access category.

3. The method of claim 2, wherein translating the data traffic comprises:
   detecting, by the UE, an internet protocol (IP) header of each data traffic of the plurality of data traffic whether a differentiated services code point (DSCP) value is set to a default value; and
   allocating, by the UE, the DSCP value in the IP header based on the priority data traffic category and the non-priority data traffic category, based on the DSCP value not being set or being set to the default value.

4. The method of claim 1, wherein modifying, by the UE, the mapping based on the priority data traffic category, the non-priority data traffic category, and the access category comprises:
   detecting, by the UE, at least one current data structure of the plurality of data structures associated with the at least one data traffic of the plurality of data traffic classified into the non-priority data traffic category;
   detecting, by the UE, an access category of the at least one current data structure as one of a priority access category and a non-priority access category; and
   downgrading, by the UE, the mapping by translating the at least one data traffic classified into the non-priority data traffic category from the at least one current data structure to the at least one another data structure of the plurality of data structures having the non-priority access category, based on the access category of the at least one current data structure indicating the priority access category.

5. The method of claim 4, wherein translating the data traffic comprises:
   detecting, by the UE, an internet protocol (IP) header of each data traffic of the plurality of data traffic whether a differentiated services code point (DSCP) value is set to a default value; and
   allocating, by the UE, the DSCP value in the IP header based on the priority data traffic category and the non-priority data traffic category, based on the DSCP value not being set or being set to the default value.

6. The method of claim 5, wherein the method comprises:
   monitoring, by the UE, a packet loss rate and an error packet for each data traffic of the plurality of data traffic based on an allocated DSCP value;
   determining, by the UE, a drop in the QoS for the data traffic classified into the priority data traffic category and the non-priority data traffic category based on the packet loss rate and the error packet; and
   modifying, by the UE, the allocated DSCP value for the data traffic classified into the priority data traffic category and the non-priority data traffic category back to the detected DSCP value in the IP header, based on the drop in the QoS being determined.

7. The method of claim 1, wherein detecting, by a UE, the plurality of data traffic of the plurality of applications is based on at least one of current activities of the UE, hardware components of the UE, a plurality traffic parameter, a QoS report received from at least one access point (AP) associated with the UE in the wireless network.

8. A method for managing a quality of service (QoS) of applications in a wireless network, the method comprising:
   receiving, by an access point (AP), a plurality of parameters from a plurality of devices available in the wireless network;
   generating, by the AP, a QoS report based on the plurality of parameters received from the plurality of devices, wherein the QoS report comprises at least one of a wireless network usage pattern by each device of the plurality of devices, a list of active devices from the plurality of devices, a list of inactive device from the plurality of devices, a metadata of data traffic associated with the list of active devices, and a metadata data traffic associated with a list of inactive devices;
   receiving, by the AP, a request message for the QoS report from a user equipment (UE) in the wireless network; and
   sending, by the AP, the QoS report to the UE for managing the QoS of the applications in the wireless network.

9. A user equipment (UE) configured to manage a quality of service (QoS) of applications in a wireless network, the UE comprising:
   a memory storing a plurality of applications;
   at least one processor; and
   a traffic translation controller communicatively coupled to the memory and the processor, wherein the traffic translation controller is configured to:

detect a plurality of data traffic of a plurality of applications based on at least one of current activities of the UE, hardware components of the UE, a plurality traffic parameters, a QoS report received from at least one AP associated with the UE in the wireless network, wherein each data traffic of the plurality of data traffic has an association with at least one data structure of a plurality of data structures of the UE, detect an enhanced distributed channel access (EDCA) function based on the plurality of data traffic, wherein the EDCA function comprises a mapping between an access category of each data structure and a traffic category of each data traffic of the plurality of data traffic based on the association, classify the plurality of data traffic of the plurality of applications into a priority data traffic category and a non-priority data traffic category based on the mapping, and modify the mapping based on the priority data traffic category, the non-priority data traffic category, and the access category.

10. The UE of claim 9, wherein the traffic translation controller is further configured to:

detect at least one current data structure of the plurality of data structures associated with at least one data traffic of the plurality of data traffic classified into the priority data traffic category;

detect an access category of the at least one current data structure as one of the priority access category and the non-priority access category; and upgrade the mapping by translating the at least one data traffic classified into the priority data traffic category from the at least one current data structure to at least one another data structure of the plurality of data structures having the priority access category, based on the access category of the at least one current data structure indicating the non-priority access category.

11. The UE of claim 10, wherein the UE is configured to:

detect in an internet protocol (IP) header of each data traffic of the plurality of data traffic whether a differentiated services code point (DSCP) value is set to a default value; and allocate the DSCP value in the IP header based on the priority data traffic category and the priority data traffic category based on the DSCP value not being set or being set to the default value.

12. The UE of claim 9, wherein the traffic translation controller is configured to:

detect at least one current data structure of the plurality of data structures associated with the at least one data traffic of the plurality of data traffic classified into the non-priority data traffic category;

detect an access category of the at least one current data structure as one of a priority access category and a non-priority access category; and downgrade the mapping by translating the at least one data traffic classified into the non-priority data traffic category from the at least one current data structure to at least one another data structure of the plurality of data structures having the non-priority access category, based on the access category of the at least one current data structure indicating the priority access category.

13. The UE of claim 12, wherein the UE is configured to:

detect in an internet protocol (IP) header of each data traffic of the plurality of data traffic whether a differentiated services code point (DSCP) value is set to a default value; and allocate the DSCP value in the IP header based on the priority data traffic category and the priority data traffic category based on the DSCP value not being set or being set to the default value.

14. The UE of claim 13, wherein the UE is configured to:

monitor a packet loss rate and an error packet for each data traffic of the plurality of data traffic based on an allocated DSCP value;

determine a drop in the QoS for the data traffic classified into the priority data traffic category based on the packet loss rate and the error packets; and modify the allocated DSCP value for the data traffic classified into the priority data traffic category and the non-priority data traffic category back to the detected DSCP value in the IP header, based on the drop in the QoS being determined.

15. The UE as claimed in claim 9, wherein the UE is configured to:

detect the plurality of data traffic of the plurality of applications based on at least one of current activities of the UE, hardware components of the UE, a plurality traffic parameter, a QoS report received from at least one access point (AP) associated with the UE in the wireless network.

* * * * *